Patented Apr. 30, 1935

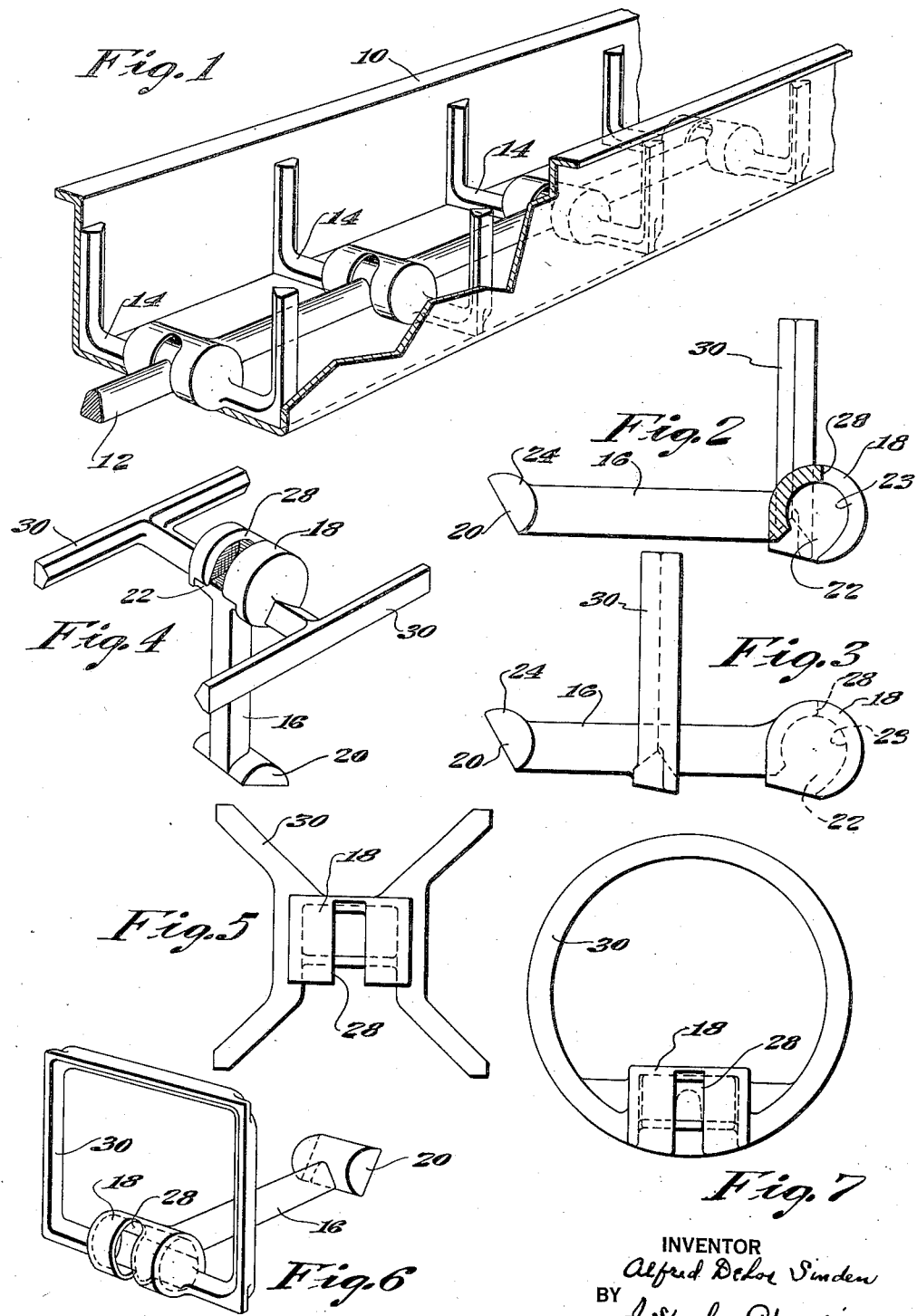

1,999,484

UNITED STATES PATENT OFFICE 1,999,484

CONVEYER

Alfred De Los Sinden, Aurora, Ill., assignor to Redler Conveyor Company, Quincy, Mass., a corporation of Massachusetts

Application November 22, 1933, Serial No. 699,181

4 Claims. (Cl. 198—168)

This invention relates to a conveyer, and more particularly to a conveyer for transporting flowable solid material in a continuous stream.

The invention has for an object to provide a novel and improved conveyer of the character specified having a novel conveying member made up of a plurality of preformed units detachably connected in a manner to be capable of pivotal movement and each of open structure, whereby to permit the individual units or flights to be easily and conveniently assembled and replaced in such manner as to minimize the liability of parts becoming broken or detached and the accompanying contamination of the material being transported.

A further and more specific object of the invention is to provide a novel and superior unitary conveying unit for use in the present conveyer.

With these general objects in view, and such others as may hereinafter appear, the invention consists in the conveyer and in the conveying element hereinafter described and particularly defined in the claims at the end of this specification.

In the drawing illustrating the preferred embodiments of the invention, Fig. 1 is a perspective view with portions broken away illustrating the present conveyer; Fig. 2 is a vertical longitudinal sectional view through one of the units of the conveyer members shown in Fig. 1; Fig. 3 is a detail in side elevation of a modified form of conveyer unit; Fig. 4 is a detail in perspective of still another form of conveyer unit; Fig. 5 is a front elevation of a modified form of conveyer unit; Fig. 6 is a perspective illustrating still another form of conveyer unit; and Fig. 7 is a front elevation of an additional form of conveyer unit.

In general, the present invention aims to provide an improved conveyer of the general type illustrated in the Redler Reissue Patent No. 18,445, April 26, 1932, and seeks to improve upon the structure therein disclosed, particularly with respect to the provision of a conveying member made up of a plurality of individual units or flights of open structure constructed to be capable of being detachably connected together in a novel and simple manner, as will be described.

To this end the units of the conveying member comprise preferably a preformed open structure having a hollow hub at one end and having at another end an enlargement capable of being received within the hollow hub of a succeeding unit to pivotally and detachably connect the units together, and each unit is further provided with an integral member adapted to impart an open structure to the unit and for cooperation with a sufficient portion of the interior of the casing to effect transportation of the material in a continuous stream therethrough.

Referring now to the drawing, the conveyer therein illustrated includes a casing 10 having a conveyer member 12 of open structure disposed therein and capable of being moved therethrough to effect the conveyance of flowable solid material through the casing in a continuous stream in the manner described in the Redler reissue patent above referred to. The conveying member 12 is in accordance with the present invention made up of a plurality of individual detachably and pivotally connected units 14 each of open structure having integral provision for connection to one another to permit the units to remain connected together in all working positions of the conveying element and to be completely detached from one another in a simple and convenient manner upon relative movement of the units into an abnormal position. Each unit 14 preferably comprises a rigid member 16 provided at one end with a hollow hub 18 and at the other end with an enlargement 20 capable of being received within the hollow hub of a succeeding unit to pivotally and detachably connect the units together. As illustrated in the drawing, the hollow hub 18 is provided with an opening 22 in the rear wall thereof arranged to extend for a sufficient distance transversely of the hollow hub 18 to permit the enlargement 20 to pass therethrough during the assembly of the units. The enlargement 20 is preferably shaped as illustrated with a cylindrical bearing surface 24 adapted to cooperate with the correspondingly shaped interior of the forward wall 23 of the hollow hub 18 during the operation of the conveyer so that each succeeding unit is drawn by the engagement of the enlargement of the preceding unit with the interior of the wall of the hollow hub in which it is received. The opening 22 in the hollow hub is preferably constructed of such width with respect to the enlargement as to prevent the enlargement from passing outwardly through the opening until the adjacent units being detached have been pivotally moved into an acute angular position with respect to one another, so that during all normal working positions of the units the parts are retained in engagement. The forward wall 23 of the hollow hub 18 of each unit is further provided with an opening or slot 28 arranged to communicate with the transversely extended opening 22 and through which the rigid member 16 of the succeeding unit is permitted to pass to permit the required pivotal movement of the units during the passage of the conveying member around the usual sprockets at each end of the conveyer.

The rigid member 16 is also in accordance with the present invention further provided with an integral member 30 adapted to impart an open structure to the unit and for cooperation with a sufficient portion of the interior of the casing to effect transportation of the material in a continuous stream therethrough, and this integral member 30 may take various forms according to the use to which the conveyer is to be put, and various illustrative forms of the integral member 30 have been herein illustrated. In Fig. 1 the member 30 is illustrated as of U-shape and formed integrally as a part of each hollow hub 18. In Fig. 3 the member 30 is illustrated as formed integrally with the rigid member 16 at an intermediate point between the ends thereof and is therein illustrated as of general U-shape. In Fig. 4 the member 30 is illustrated as of general H-shape with the hollow hub 18 formed as a part of the crossbar of the H. In Fig. 5 the integral member 30 is illustrated as being of general X-shape, in which the ends of the integral member are adapted to cooperate with the corners of the interior of the casing to effect the desired transportation of the material in a continuous stream. The hollow hub 18 may, as illustrated in Fig. 5, be formed as an integral part of the X member. In Figs. 6 and 7 the integral member is illustrated as formed of general rectangular and circular shape, respectively, and while a number of modified forms and shapes of the integral member have been herein illustrated, it is to be understood that the invention is not limited to any particular shape, but that various skeletonized forms may be utilized which are adapted for cooperation with a sufficient portion of the interior of the casing to effect transportation of the material in a continuous stream therethrough.

From the description thus far, it will be observed that the present conveyer possesses all of the advantages of the so-called cable type of open flight conveyer of the prior art with none of the disadvantages. Experience has shown that in some instances and for some purposes liability exists for the flights to slip upon the cable and consequently to change the pitch between flights with consequent disability to travel around the sprockets. In addition, in short lengths of conveyers the excessive number of bends imposed upon the cable detracts materially from the life thereof. In most all cables utilized in conveyers of the character specified internal lubrication has been found necessary in order to permit the cable to flex, and the liability of the lubricant working into food products being conveyed by the conveyer is completely eliminated by the present invention which can be operated dry.

While the preferred embodiments of the present invention have been herein illustrated and described, it will be understood that the invention may be embodied in other forms within the scope of the following claims.

Having thus described the invention, what is claimed is:

1. In a conveyer for conveying flowable solid material, a transporting member comprising a plurality of preformed units detachably connected together and each being provided with a flight, each unit comprising a centrally disposed connecting member provided at one end with a hollow hub and at the opposite end with an enlargement capable of being received within the hollow hub of the next succeeding unit to pivotally and detachably connect the units together when in a normal position, said hollow hub having the interior of its rear wall curved and provided with a vertical slot therein for the reception of said centrally disposed connecting member to permit vertical pivotal movement thereof, and being further provided with a transversely extended opening through which the aforesaid enlargement may pass into and from said hollow hub, the portions of said enlargement projecting from opposite sides of said connecting member having curved rear walls for cooperation with the curved rear walls of the interior of said hub.

2. In a conveyer for conveying flowable solid material, a transporting member comprising a plurality of preformed units detachably connected together and each being provided with a flight, each unit comprising a centrally disposed connecting member provided at one end with a hollow hub and at the opposite end with an enlargement capable of being received within the hollow hub of the next succeeding unit to pivotally and detachably connect the units together when in a normal position, said hollow hub being provided with connected openings in the lateral surface thereof, one opening comprising a vertically arranged slot for the reception of and to permit vertical pivotal movement of said centrally disposed connecting member, and the second opening being transversely extended and arranged to permit said units to be detached by movement in a vertical direction after having been pivotally moved vertically into a predetermined position.

3. In a conveyer for conveying flowable solid material, a transporting member comprising a plurality of preformed units detachably connected together and each being provided with a flight, each unit comprising a centrally disposed connecting member provided at one end with a hollow hub and at the opposite end with an enlargement capable of being received within the hollow hub of the next succeeding unit to pivotally and detachably connect the units together when in a normal position, said hollow hub member being provided with two connected openings in the surface thereof, one opening comprising a vertically arranged slot for the reception of and to permit the vertical pivotal movement of said centrally disposed connecting member, the second opening comprising a transversely extended slot in the under surface of said hub whereby upon pivotal vertical movement of said units one unit may be thereafter detached from the other by continued vertical movement.

4. In a conveyer for conveying flowable solid material, a transporting member comprising a plurality of preformed units each provided with a flight, said units comprising a centrally disposed connecting member provided at one end with a hollow hub and at the opposite end with an enlargement for reception within the hollow hub of a succeeding unit, said hollow hub being provided in its surface with two connecting slots arranged at substantially right angles to one another and through one of which a centrally disposed connecting member is extended to permit pivotal movement thereof, said slots being arranged to prevent detachment of the units until they have been relatively moved into an abnormal position by the pivotal movement of said connecting member through said slot and to permit detachment of said units upon continued movement in the same direction.

ALFRED DE LOS SINDEN.